(12) United States Patent
Pan

(10) Patent No.: US 7,199,975 B1
(45) Date of Patent: Apr. 3, 2007

(54) MAGNETIC HEAD FOR PERPENDICULAR RECORDING WITH HARD BIAS STRUCTURE FOR WRITE POLE TIP

(75) Inventor: Tao Pan, San Jose, CA (US)

(73) Assignee: Western Digital (Fremont), Inc., Fremont, CA (US)

( * ) Notice: Subject to any disclaimer, the term of this patent is extended or adjusted under 35 U.S.C. 154(b) by 429 days.

(21) Appl. No.: 10/846,040

(22) Filed: May 15, 2004

(51) Int. Cl.
*G11B 5/147* (2006.01)

(52) U.S. Cl. ................................. 360/126; 360/128

(58) Field of Classification Search ................ None
See application file for complete search history.

(56) References Cited

U.S. PATENT DOCUMENTS 6,185,081 B1   2/2001   Simion et al.
7,023,660 B2 *  4/2006   Hsiao et al. ................. 360/128
7,070,716 B2 *  7/2006   Lam ............................ 360/126

OTHER PUBLICATIONS

K. Nakamoto, et al. Single-Pole/TMR Heads for 140-Gb/in Perpendicular Recording IEEE Transactions on Magnetics, vol. 40 No. 1 Jan. 2004.

* cited by examiner

*Primary Examiner*—A. J. Heinz
(74) *Attorney, Agent, or Firm*—Strategic Patent Group

(57) ABSTRACT

A magnetic head for writing information on a relatively-moving medium is disclosed, the head having a leading end, a trailing end and a medium-facing surface, the head comprising: a soft magnetic write pole that terminates in a pole tip that is disposed adjacent to the medium-facing surface; at least one coil section that is disposed adjacent to the write pole to induce a magnetic flux in the write pole; and a hard magnetic bias structure disposed within one micron of the pole tip to magnetically bias the pole tip.

29 Claims, 5 Drawing Sheets

MAGNETIC HEAD FOR PERPENDICULAR RECORDING WITH HARD BIAS STRUCTURE FOR WRITE POLE TIP

BACKGROUND

The present invention relates to electromagnetic transducers for information storage and retrieval systems, such as disk or tape drives.

Current commercially available disk drives employ magnetoresistive (MR) sensors for reading data, and store data in domains having magnetizations that are substantially parallel to concentric media tracks, the parallel magnetic storage sometimes called longitudinal recording. It has been predicted that such longitudinal magnetic storage will become unstable at normal operating conditions when the domains reach a minimal size, termed the superparamagnetic limit. In order to store the data at higher density, the drive system may instead be designed to store data in domains that are substantially perpendicular to the disk surface, which may be termed perpendicular recording.

FIG. 9 shows a prior art system for perpendicular recording, which includes an inductive transducer 20 positioned in close proximity to a surface 25 of a medium such as a disk 22. The inductive transducer 20 has a U-shaped core 30 formed of high-permeability, low-coercivity or "soft magnetic" material and the disk 22 has a soft magnetic underlayer 33, the core and underlayer forming a magnetic circuit indicated by flux lines 28 that traverse a higher coercivity media layer 32, for magnetizing the media layer or reading the magnetization of the media layer. The core has magnetic pole tips 36 and 38 that differ in media-facing area so that the magnetic signal is concentrated in the smaller pole tip 36 for reading or writing data. The local portion of the disk may be travelling in the direction of arrow 40 or in a reverse direction, to write magnetic signals on a track. The pole tips are sufficiently separated to encourage magnetic flux to travel through the media, instead of across a submicron nonmagnetic gap that is typically employed for longitudinal recording. The prior art transducer of FIG. 9 is sometimes called a probe head.

Pole tip 36, which may be termed a write pole tip, may have a track-width and track-length dimensions that are each less than one micron, so that the media-facing area of the write pole tip is less than one square micron. A write pole layer may extend much further from the pole tip than it does in either the track-width or track-length dimensions, and so may sometimes be termed a probe layer. Such probe layers may have a remnant magnetization and/or domain instability that can cause partial erasure of recorded tracks.

Improved perpendicular recording heads are disclosed in U.S. patent application Ser. No. 10/724,385 (K35R1832) and U.S. patent application Ser. No. 10/724,309 (K35R1883), which are incorporated herein by reference. In those applications, a deflection pole is located downstream of the write pole tip, so that the magnetic field from the write pole tip is deflected from perpendicular and is more efficient in rotating perpendicular bits in the media. The deflection pole tip may be separated from the write pole tip by a submicron nonmagnetic gap that extends from the pole tips by a distance that may be termed a throat height.

In an article entitled "Single-Pole/TMR Heads for 140-Gb/in$^2$ Perpendicular Recording," Nakamoto et al. teach that data erasure, which is observed as write instability in a repeated read-rite operation, can be suppressed by combining a low throat height and a pole that is laminated with nonmagnetic layers so that the magnetic layers are antiparallel.

SUMMARY

In one embodiment, a magnetic head for writing information on a relatively-moving medium is disclosed, the head having a leading end, a trailing end and a medium-facing surface, the head comprising: a soft magnetic write pole that terminates in a pole tip that is disposed adjacent to the medium-facing surface; at least one coil section that is disposed adjacent to the write pole to induce a magnetic flux in the write pole; and a hard magnetic bias structure disposed within one micron of the pole tip to magnetically bias the pole tip.

In one embodiment, a magnetic head for writing information on a relatively-moving medium is disclosed, magnetic head having a leading end, a trailing end and a medium-facing surface, the head comprising: a first ferromagnetic layer that terminates adjacent to the medium-facing surface in a first pole tip; a second ferromagnetic layer that terminates adjacent to the medium-facing surface in a second pole tip, the second ferromagnetic layer being magnetically coupled to the first ferromagnetic layer, the second pole tip having an area that is at least two orders of magnitude greater than that of the first pole tip; and a third ferromagnetic layer having a coercivity that is higher than that of the first and second ferromagnetic layers, the third ferromagnetic layer being disposed within one micron of the first pole tip to magnetically bias the first pole tip.

In one embodiment, a magnetic disk drive for writing information is disclosed comprising: a magnetic disk; and a magnetic head including a soft magnetic write pole that terminates in a pole tip that is disposed adjacent to the medium-facing surface, at least one coil section that is disposed adjacent to the write pole to induce a magnetic flux in the write pole, and a magnetic bias structure disposed within one micron of the pole tip to magnetically bias the pole tip.

DETAILED DESCRIPTION OF THE PREFERRED EMBODIMENT

Figure 1:
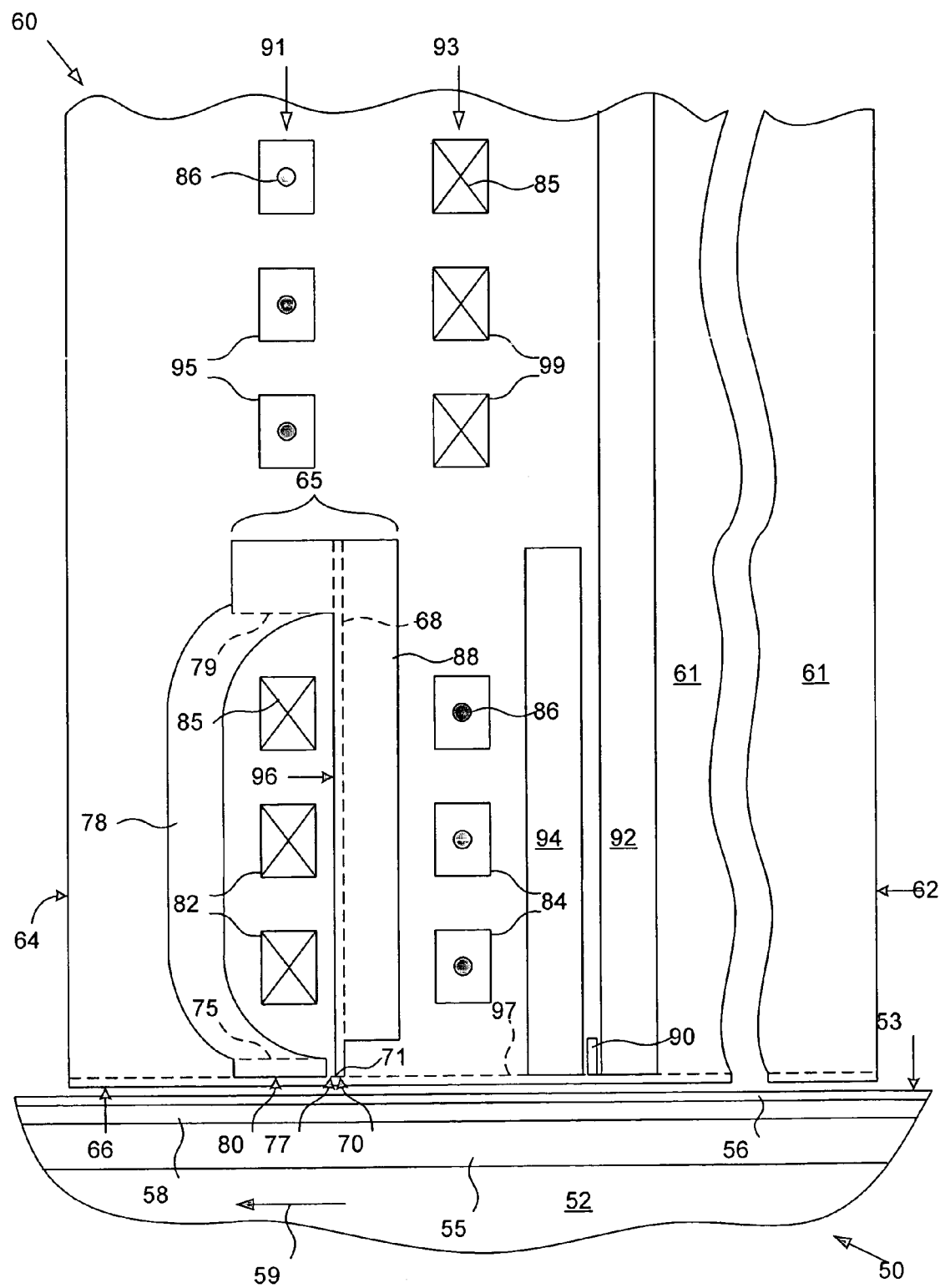
FIG. 1 is a cutaway cross-sectional view of disk drive including an electromagnetic head in proximity to a relatively moving medium.

FIG. 1 is a cutaway cross-sectional view of a magnetic head 60 in proximity to a relatively moving medium 50. The medium 50 includes a substrate 52 over which a soft magnetic underlayer 55 has been formed. A media layer 58 is disposed over the underlayer 55, the media layer having an easy axis of magnetization that is substantially perpendicular to a major surface 53 of the medium. A thin, physically hard overcoat 56 separates the media layer 58 from the medium surface 53. The medium 50, which may for example be a rigid disk, is moving relative to the head in a direction shown by arrow 59. The head 60 may be spaced from the medium 50 by a nanoscale air bearing, or the head may be in frequent or continuous contact with the medium during operation. The word nanoscale as used herein is meant to represent a size that is most conveniently described in terms of nanometers, e.g., between about one nanometer and about two hundred nanometers.

The head 60 has a leading end 62, a trailing end 64 and a medium-facing surface 66. A first ferromagnetic layer 68 disposed in the head terminates adjacent to the medium-facing surface in a first pole tip 70. A second ferromagnetic layer 78 is magnetically coupled to the first ferromagnetic layer 68 in a region 65 that is removed from the medium-facing surface 66, the second ferromagnetic layer terminating adjacent to the medium-facing surface in a second pole tip 80. The second pole tip 80 is disposed between the first pole tip 70 and the trailing end 64, the second pole tip being separated from the first pole tip by a nanoscale nonferromagnetic gap 77.

A third ferromagnetic layer 88 adjoins the first ferromagnetic layer 68 but terminates further from the medium-facing surface 66 than the first pole tip 70, layers 68 and 88 combining to form a write pole layer. A ferromagnetic pedestal 75 and a ferromagnetic stud 79 can be considered to form part of the second ferromagnetic layer 78. The ferromagnetic layers 68, 78 and 88 of the head 60 may have a permeability of at least one thousand, while layer 68 may also be formed of a high magnetic moment material, e.g., having a magnetic saturation of at least twenty kiloGauss. First ferromagnetic layer 68 has a trailing edge 96 disposed adjacent to trailing end 64. A trailing corner 71 of first pole tip 70, disposed where first pole tip 70 meets trailing edge 96, is approximately equidistant from soft magnetic underlayer 55 and soft magnetic pole layer 78 in this example. The first pole tip 70, including the trailing corner 71, is in this embodiment made of higher magnetic saturation material than that of soft magnetic pole layer 78.

A plurality of electrically conductive coil sections 82 are disposed between the first ferromagnetic layer 68 and the second ferromagnetic layer 78 to induce magnetic flux in the first, second and third ferromagnetic layers 68, 78 and 88. Those ferromagnetic layers 68, 78 and 88 form a magnetic loop around coil sections 82, the loop interrupted by nanoscale nonferromagnetic gap 77. Another plurality of electrically conductive coil sections 86 may be similarly disposed between the first ferromagnetic layer 68 and the leading end 62. Crosses 85 in the coil sections 82 indicate electric current that is flowing away from the viewer and into the page, while dots 86 in the coil sections 84 indicate electric current that is flowing toward the viewer and out of the page. With electric current flowing in substantially opposite directions in sections 82 and 84 as shown, the magnetic field from the coil sections 82 and 84 adds together in the area between the sections 82 and 84 and is at least partly cancelled in areas outside the sections 82 and 84 that are closer to the leading or trailing end.

The coil sections 82 in this embodiment are part of a first coil layer 91 that spirals around stud 79 and coupling region 65 and includes electrically conductive coil sections 95. Coil sections 84 are part of a second coil layer 93 that spirals around an axis substantially aligned with that of the first coil layer, and includes electrically conductive coil sections 99. Another magnetic stud, not shown, may optionally be provided at the axis of coil layer 93 and coupled to ferromagnetic layer 88. Coil sections 95 have electric current that is flowing toward the viewer and out of the page, as indicated by dots 86, while coil sections 99 have electric current that is flowing away from the viewer and into of the page, as indicated by crosses 85. Advantages of a reversed double coil layer configuration such as this include a stronger applied field between the coil layers 91 and 93 and reduced or cancelled field leading and trailing the coil layers, as well as reduced coil inductance and reduced amplification of stray signals due to an antenna effect. The coil layers may spiral in identical directions, e.g., both spiraling inward in a counterclockwise direction when viewed from the trailing end, and be interconnected at the center sections or outermost sections. Alternatively, the coil layers may spiral in opposite directions and have the center section of one layer connected to the outermost section of the other layer. In one embodiment twelve or fewer coil sections are disposed between ferromagnetic layers 68 and 89.

Instead of the configuration shown in FIG. 1, coil sections 82 and 84 may spiral in a barber pole formation around ferromagnetic layers 68 and 88, without the need for coil sections 95 and 99. Alternatively, instead of plural coil sections 82, a single coil section or multiple coil sections may pass between layers 68 and 78. For the case in which coil section 82 is a single section formed as a layer, that layer may be connected to a similar layer disposed between layer 88 and the leading end 62. This formation may be termed a single turn coil.

The ferromagnetic layers 68 and 78 of the head 60 together with the soft magnetic underlayer 55 of the disk 50 form a magnetic circuit that traverses the media layer adjacent to the first pole tip 70 and the second pole tip 80. Although not clear in this cross-sectional view, the second pole tip 80 has a medium-facing area that is at least two orders of magnitude greater than that of the first pole tip 70, to avoid overwriting with the second pole tip signals that were imparted to the media layer by the first pole tip. Ferromagnetic layers 68 and 78 also form a magnetic circuit that is interrupted by the gap 77 so that fringe fields from that circuit traverse the media layer adjacent to the gap 77. These magnetic circuits add to create a maximum magnetic flux in the media-layer 58 at a location closest to the gap and at an angle from perpendicular to the medium surface 53.

The head 60 also includes a magnetoresistive (MR) sensor 90 sandwiched between first and second soft magnetic shield layers 92 and 94. The MR sensor 90 can be any sensor that utilizes a change in resistance caused by a change in magnetic field to sense that field, which may be measured as a change in current or voltage across the sensor, including anisotropic magnetoresistive (AMR) sensors, spin-valve (SV) sensors, spin-tunneling (ST) sensors, giant magnetoresistive (GMR) sensors and colossal magnetoresistive (CMR) sensors. Although the sensor is shown separated from the shields 92 and 94, in an alternative embodiment the sensor may be electrically connected to the shields, so that sense current flows in a current perpendicular to plane (CPP) mode. Other electromagnetic sensors, such as optical sensors, can alternatively be employed to sense magnetic fields from the medium.

A thin hard coating 97 formed for example of diamond-like carbon (DLC), silicon carbide (SiC), tetrahedral amorphous carbon (ta-C) or the like protects the MR sensor 90 from corrosion or other damage, the coating forming at least part of the medium-facing surface 66. The MR sensor 90 is disposed adjacent to a substrate 61 on which the aforementioned thin film layers of the head 60 have been formed. The substrate 61 may extend much further between the first shield 92 and the leading end 62 than the distance between the first shield and the trailing end 64, and may be formed of any appropriate substrate material known in the art of magnetic heads, such as alumina, silicon, alumina-titanium-carbide, ferrite, etc.

Figure 2:
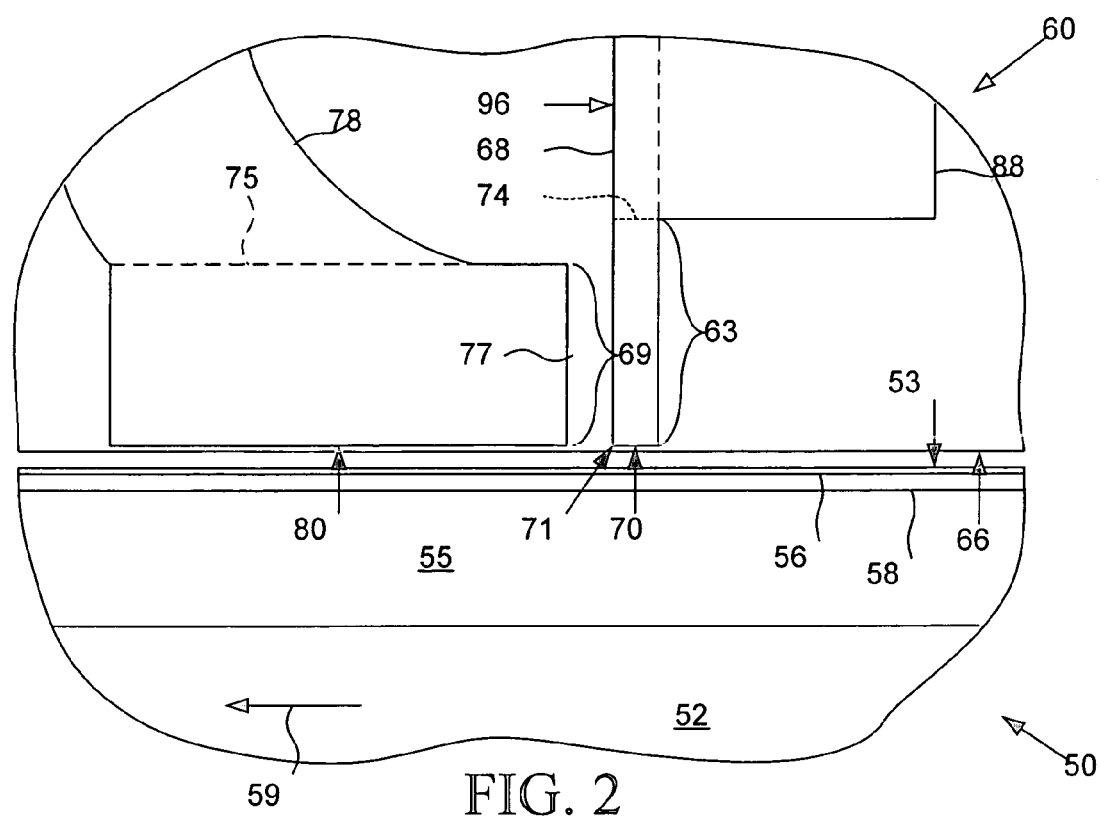
FIG. 2 is an expanded cutaway cross-sectional view of the head of FIG. 1 that focuses on a region around the pole tips of that head.
Figure 3:
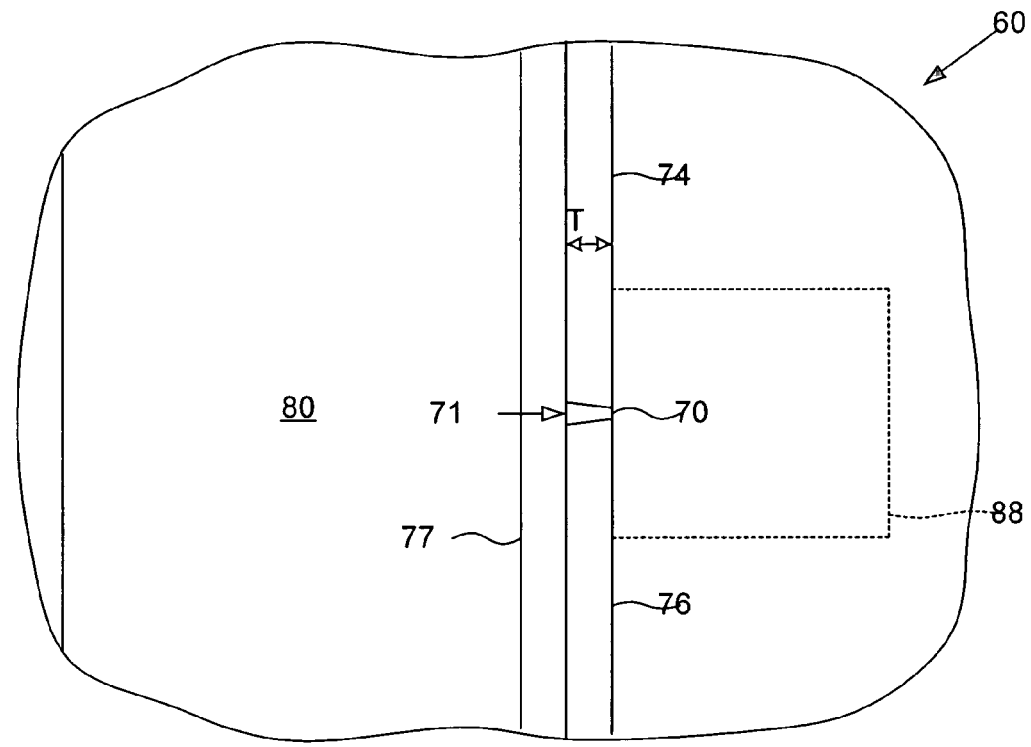
FIG. 3 is a view of the head of FIG. 2 as would be seen from the medium and illustrating a hard magnetic bias structure adjoining a write pole tip.

FIG. 2 is an expanded cross-sectional view that focuses on the region around pole tips 70 and 80, and FIG. 3 is a view of that region as would be seen from the medium 60, looking through the thin transparent coating 97. As shown in FIG. 2, the nonmagnetic gap 77 expands at a throat height 69, which is measured from the medium-facing surface and which in this embodiment is essentially equal to the extension of ferromagnetic pedestal 75 from the medium-facing surface 66. The throat height 69 is a parameter in controlling how much flux is diverted from layer 68 to layer 78, rather than travelling through the medium, and thus affects the efficiency of the head. For most embodiments, a throat height 69 of less than about one micron is preferable. In this embodiment, nonmagnetic gap 77 expands to be greater than one-half micron at a throat height of less than one-half micron. Pedestal 75 provides precise fabrication tolerance for the throat height 69. The distance 63 for which pole layer 68 extends beyond pole layer 88 may be termed a nose length.

Although not actually evident in the cross section of FIG. 2 that bisects the pole layer 68, a magnetically hard bias structure 74 that is aligned with the pole layer 68 in a track-width direction is indicated by a dotted line. In this embodiment, the bias structure 74 extends a similar distance from the medium-facing surface 66 as the nose length 63. Although bias structure 74 extends the same as the nose length 63, the nose length 63 can instead extend a greater or lessor amount than the bias structure 74 from the medium-facing surface 66.

During recording, magnetic flux, induced by electric current in the coils, flows through soft magnetic pole layer 88 and is concentrated in high magnetic moment layer 68. From layer 68 the flux 98 emanates from write pole tip 70 and traverses media layer 58 to flow through the soft magnetic underlayer 55, thereafter crossing return pole tip 80 to flow through layer 78. Flux from layer 68 also emanates from a trailing edge 96 of that layer, traversing gap 77 to flow into the return pole layer 80. Because of this dual flux path, the strongest flux emanates from trailing corner 71 with a field directed substantially parallel or antiparallel to that of the arrow that touches that corner 71. The angled flux provides increased efficiency in rotating vertically oriented bits in the media layer 58.

Because the medium is moving relative to the head in the direction shown by arrow 59, a media layer 58 bit that has been magnetized by angled flux 98 from trailing corner 71 subsequently encounters flux that is directed from soft underlayer 55 to pole tip 80. The flux 98 traversing media layer 58 adjacent to return pole tip 80, however, is much less concentrated than that adjacent to trailing corner 71, and also less effective due to being oriented more parallel to the easy axis of magnetization of media layer 58.

FIG. 3 is a cutaway view of the head 60 of FIG. 1 as seen from the medium, looking through the thin transparent coating 97 of the medium-facing surface 66, which are therefore not evident in this figure. Although not necessarily drawn to scale, the dramatically different size of the write pole tip 70 compared to the return pole tip 80 is apparent. The write pole tip 70 may be trapezoidal in shape, with a track-width dimension along trailing corner 71 of approximately 0.15 micron or less, and a track-length dimension of approximately one-half micron or less, and preferably less than one-quarter micron. The medium-facing area of write pole tip 70 is therefore less than 0.08 square microns (less than 80,000 square nanometers). Return pole tip 80 may measure on the order of 1.0 micron in the track-length dimension, and may extend 10 to 100 microns in the track-width dimension, large enough that the full width of this embodiment is not shown in this cutaway drawing. The medium-facing area of return pole tip 80 is therefore at least two orders of magnitude greater than that of medium-facing area of write pole tip 70. In an alternative embodiment an additional return pole tip may be provided, so that return pole tip 80 need not be so much larger than write pole tip 70.

Hard magnetic bias structures 74 and 76 are clearly evident in FIG. 3. Also evident are write pole tip 70 and return pole tip 80, and write pole layer 88 is illustrated with a dotted line to indicate its presence within a micron or so of the medium-facing surface. In this embodiment, bias structures 74 and 76 are layers having a thickness that is substantially the same as write pole layer 68, the layers adjoining write pole layer 68 and write pole tip 70. In other embodiments, bias structures need not adjoin write pole layer 68 or write pole tip 70. Also, such bias structures may each include plural layers, and the plural layers as well as the overall structures 74 and 76 may have a different thickness than write pole layer 68.

In general, the magnetic thickness (Mrt), which is the product of the remnant magnetic moment density (Mr) and the layer thickness (T), needs only to be sufficient to stabilize the domains in the write pole layer 68 near the write pole tip 70, and so high moment materials are not necessary. Using hard magnetic materials that do not have a high moment can help to ensure that the bias structures do not destabilize written bits on the media. For example, the Mrt of the bias structure may only need to exceed 5% of the Mrt of the write pole layer 68. Depending upon the desired magnetic stiffness of the write pole layer 68, the Mrt of the bias structure may be greater than 25% of the write pole layer 68 Mrt and may exceed 100% of the write pole layer 68 Mrt. Moreover, the thickness (T) of layers 74 and 76 do not necessarily need to be equal to that of the write pole layer 68. For example, assuming that the Mr of the write pole layer 68 is approximately equal to that of the bias structures 74 and 76, the bias structures can each have a thickness that is greater than 5% of the write pole layer 68 thickness.

Bias structures 74 and 76 may be formed of permanent or hard magnet material such as iron (Fe), cobalt (Co), or cobalt-chromium-platinum (CoCrPt), or cobalt-samarium (CoSm), or alloys that are rich in those materials and having a coercivity of at least 4000 Oe. Bias layers 74 and 76 can be initialized by application of an appropriate magnetic field at the wafer level, at the row bar level, at the head level or at the drive level, even inside a sealed drive. Such initialization can coincide with initialization of hard bias layers for the free layer of the sensor 90.

Figure 4:
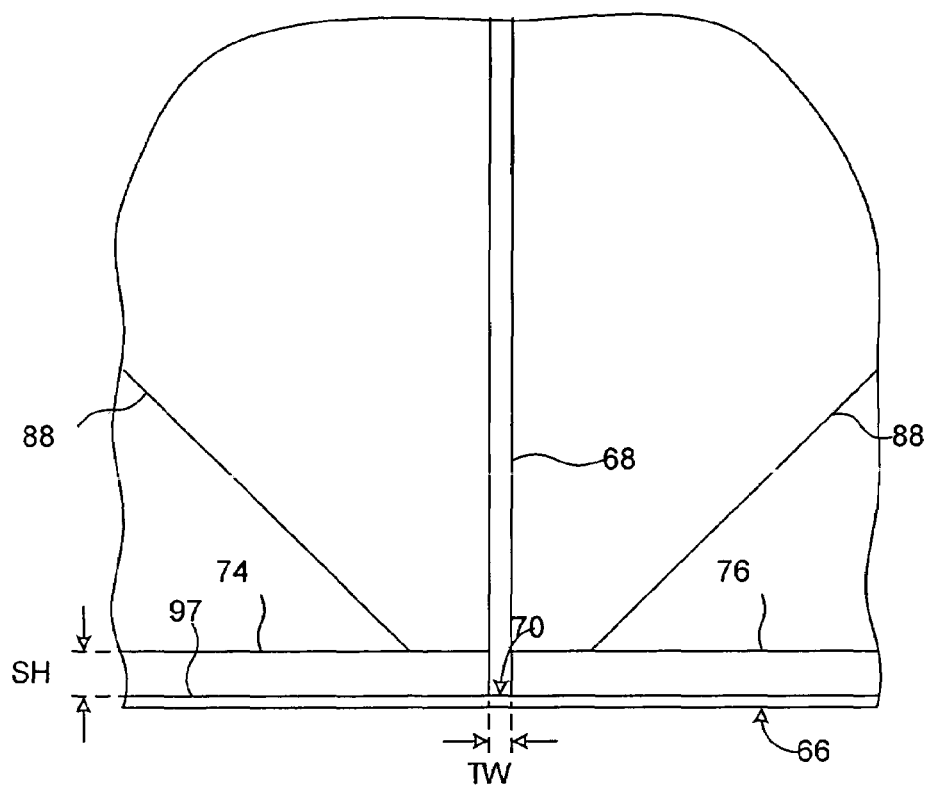
FIG. 4 is a cutaway opened-up view of the head of FIG. 1 as would be seen looking at the trailing end and focusing on the elements disposed adjacent to the write pole tip.

FIG. 4 is a cutaway opened-up view of the head 60 of FIGS. 1–3 as would be seen from the trailing end 64, with pole layer 78 and coil layer 91 removed to better illustrate the embodiment. Write pole layer 68 has been formed atop tapered pole layer 88, and hard magnetic bias structures 74 and 76 abut pole layer 68 adjacent write pole tip 70. The extension of hard magnet stripes 74 and 76 in a track-width (TW) direction compared to stripe-height (SH) or thickness (T) dimensions provides a geometric anisotropy that favors magnetization of the stripes 74 and 76 in the track-width (TW) direction. For example, the stripes may extend at least ten times further in the track-width (TW) direction than in the stripe-height (SH) or thickness (T) directions.

Figure 5:
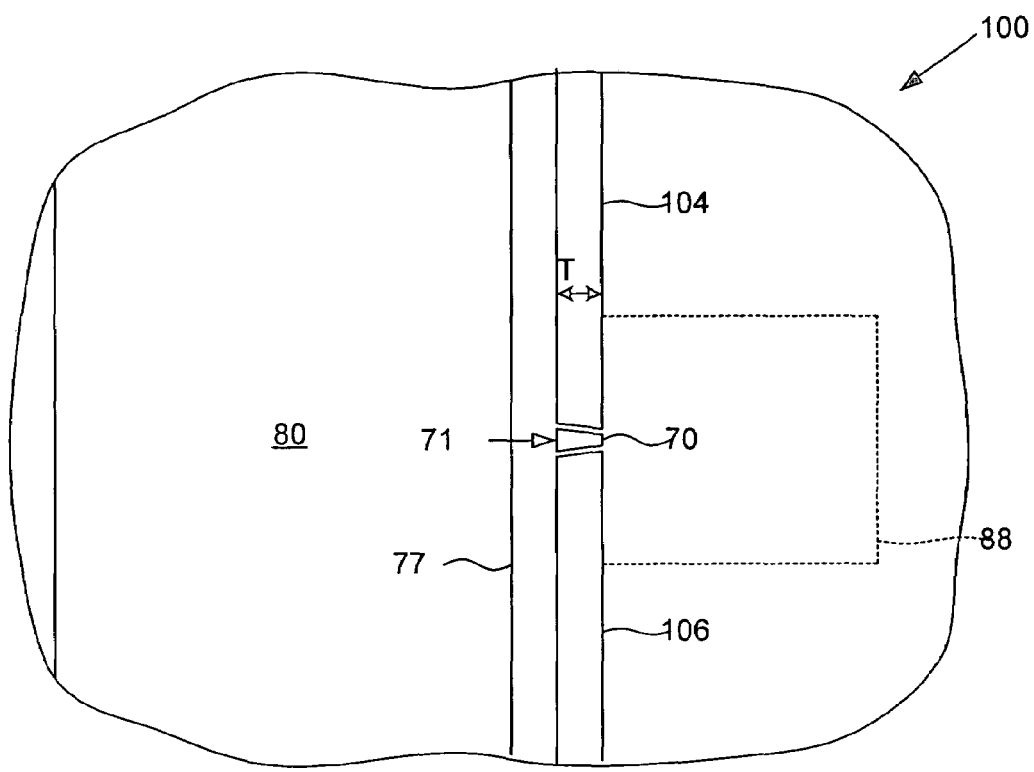
FIG. 5 is a view of the head of FIG. 1 as would be seen from the medium and illustrating a hard magnetic bias structure that is separated from the write pole tip by less than one micron.

FIG. 5 is a cutaway view of a head 100 that is similar to that of FIGS. 1–4, but which has hard magnetic bias structures 104 and 106 that are separated from write pole tip 70 by nonmagnetic material. As with the previous embodiments, edge effects in ends of the bias structures closest to the write pole provide bias fields to reduce or prevent magnetic instability that could otherwise lead to data erasure. The hard magnetic bias structures 104 and 106 may be separated from write pole tip 70 by a nonmagnetic material layer having a thickness in a range between a few angstroms and at least a micron, depending upon the Mrt of the layers 104 and 106 and the characteristics of the write pole layer 68 and tip 70.

Figure 6:
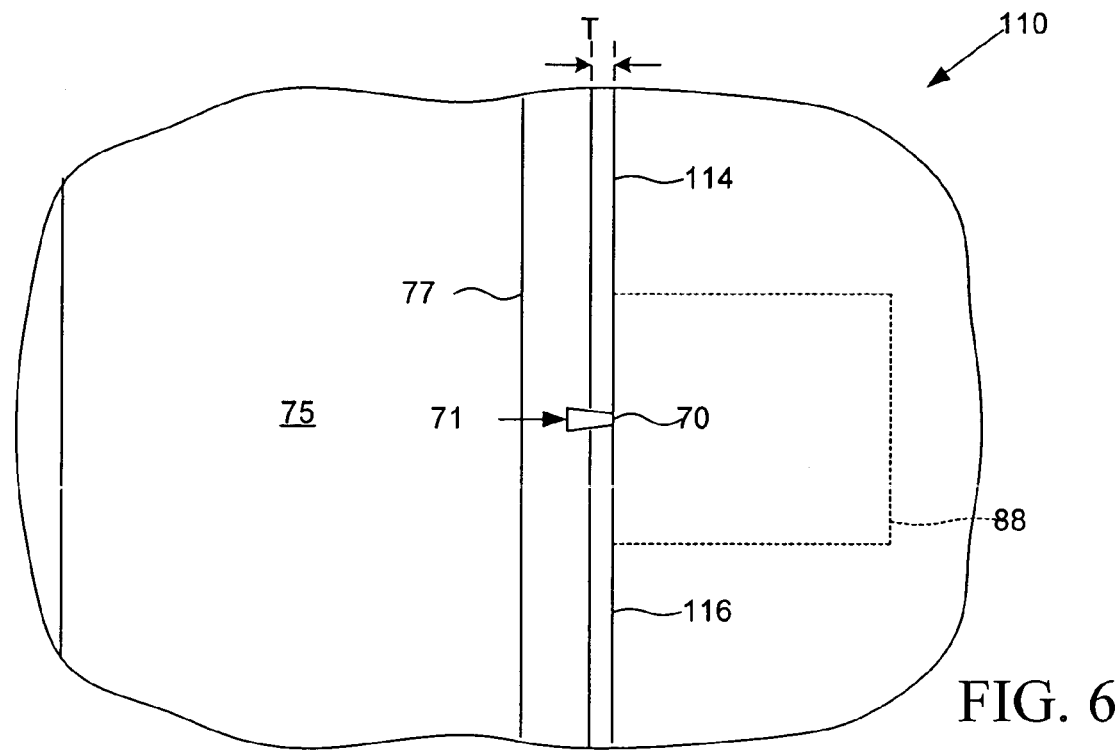
FIG. 6 is a view of the head of FIG. 1 as would be seen from the medium and illustrating a hard magnetic bias structure that has a thickness that is less than that of the write pole tip.

FIG. 6 is a cutaway view of a head 110 that is similar to that shown in FIG. 3, but which has hard magnetic bias structures 114 and 116 that have a thickness (T) that is less than that of write pole layer 68 or write pole tip 70. As with the previous embodiments, edge effects in ends of the bias structures closest to the write pole provide bias fields to reduce or prevent magnetic instability that could otherwise lead to data erasure. The hard magnetic bias structures 114 and 116 have a thickness T that may be greater than or less than that of the write pole layer 68 and tip 70, the bias layer thickness T in a range between a few angstroms and at least one-half micron, depending upon the Mrt of the layers 104 and 106 and the characteristics of the write pole layer 68 and tip 70. Although the bias structures 114 and 116 are depicted as being substantially aligned with the leading end of the write pole layer 68 and tip 70, they may alternatively be substantially aligned with the trailing end of layer 68 and tip 70, or aligned between the leading and trailing ends.

Figure 7:
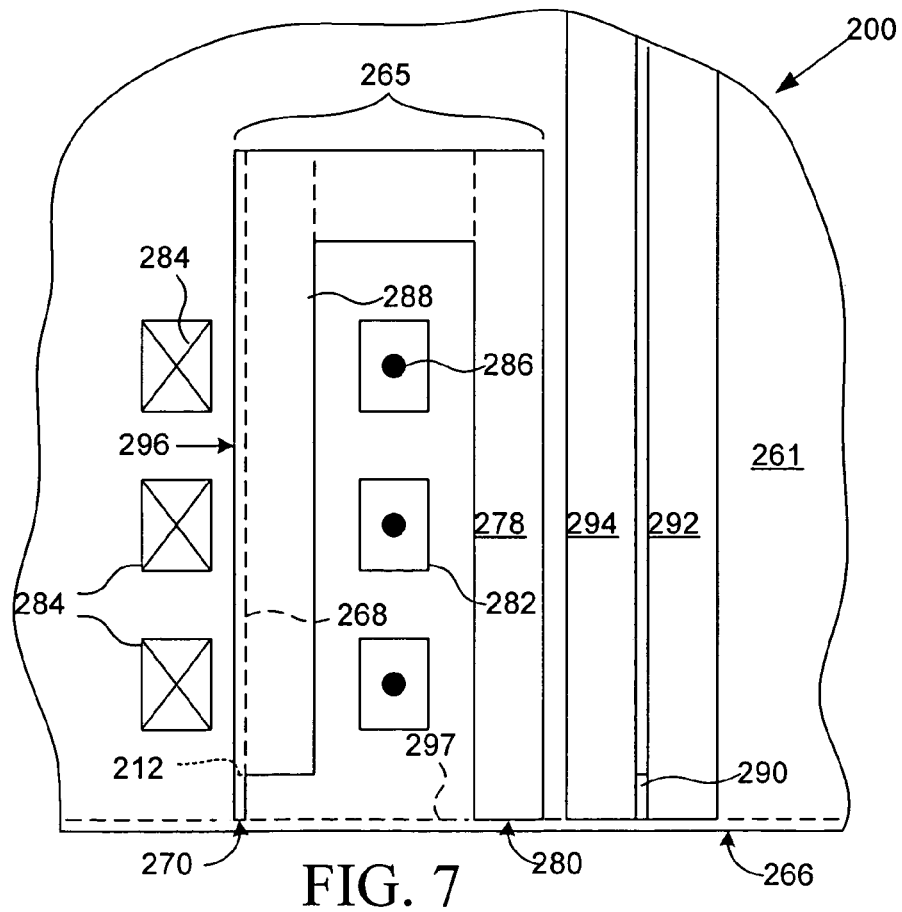
FIG. 7 is a cutaway cross-sectional view of another perpendicular recording head having a hard magnetic bias structure for a write pole tip.

FIG. 7 is a cutaway cross-sectional view of another magnetic head 200 designed for perpendicular recording on a relatively moving medium. The head 200 has a leading end, a trailing end and a medium-facing surface 266. A first ferromagnetic layer 268 disposed in the head terminates adjacent to the medium-facing surface in a first pole tip 270. A second ferromagnetic layer 278 is magnetically coupled to the first ferromagnetic layer 268 in a region 265 that is removed from the medium-facing surface 266, the second ferromagnetic layer terminating adjacent to the medium-facing surface in a second pole tip 280, which may have a media-facing area that is at least two or three orders of magnitude greater than that of the write pole tip 270. A third ferromagnetic layer 288 adjoins the first ferromagnetic layer 268 but terminates further from the medium-facing surface 266 than the first pole tip 270, layers 268 and 288 combining to form a write pole layer.

A plurality of electrically conductive coil sections 282 are disposed between the first ferromagnetic layer 268 and the second ferromagnetic layer 278 to induce magnetic flux in the first, second and third ferromagnetic layers 268, 278 and 288. Those ferromagnetic layers 268, 278 and 288 form a magnetic loop around coil sections 282, the loop completed by a soft magnetic underlayer of the medium. Another plurality of electrically conductive coil sections 284 may be similarly disposed between the first ferromagnetic layer 268 and the trailing end. Crosses 285 in the coil sections 284 indicate electric current that is flowing away from the viewer and into the page, while dots 286 in the coil sections 282 indicate electric current that is flowing toward the viewer and out of the page. With electric current flowing in substantially opposite directions in sections 282 and 284 as shown, the magnetic field from the coil sections 282 and 284 adds together in the area between the sections 282 and 284 and is at least partly cancelled in areas outside the sections 282 and 284 that are closer to the leading or trailing end.

The coil sections 282 in this embodiment are part of a first coil layer that spirals around coupling region 265, while coil sections 284 are part of a second coil layer that spirals around an axis substantially aligned with that of the first coil layer. Advantages of a reversed double coil layer configuration such as this include a stronger applied field between the coil layers and reduced or cancelled field leading and trailing the coil layers, as well as reduced coil inductance and reduced amplification of stray signals due to an antenna effect. The coil layers may spiral in identical directions, e.g., both spiraling inward in a counterclockwise direction when viewed from the trailing end, and be interconnected at the center sections or outermost sections. Alternatively, the coil layers may spiral in opposite directions and have the center section of one layer connected to the outermost section of the other layer. Instead of the configuration shown in FIG. 7, coil sections 282 and 284 may spiral in a barber pole formation around ferromagnetic layers 268 and 288. Alternatively, instead of plural coil sections 282, a single coil section or multiple coil sections may pass between layers 268 and 278.

The head 200 also includes a magnetoresistive (MR) sensor 290 sandwiched between first and second soft magnetic shield layers 292 and 294. The MR sensor 90 can be any sensor that utilizes a change in resistance caused by a change in magnetic field to sense that field, which may be measured as a change in current or voltage across the sensor, including anisotropic magnetoresistive (AMR) sensors, spin-valve (SV) sensors, spin-tunneling (ST) sensors, giant magnetoresistive (GMR) sensors and colossal magnetoresistive (CMR) sensors. Although the sensor is shown electrically connected to the shields 292 and 294 so that sense current flows in a current perpendicular to plane (CPP) mode, in an alternative embodiment the sensor may be electrically separated from the shields, so that sense current flows in a current in plane (CIP) mode. Other electromagnetic sensors, such as optical sensors, can alternatively be employed to sense magnetic fields from the medium.

A thin hard coating 297 formed for example of diamond-like carbon (DLC), silicon carbide (SiC), tetrahedral amorphous carbon (ta-C) or the like protects the MR sensor 290 from corrosion or other damage, the coating forming at least part of the medium-facing surface 266. The MR sensor 290 is disposed adjacent to a substrate 261 on which the aforementioned thin film layers of the head 200 have been formed. The substrate 261 may be formed of any appropriate substrate material known in the art of magnetic heads, such as alumina, silicon, alumina-titanium-carbide, ferrite, etc.

Although not actually evident in the cross section of FIG. 7 that bisects the pole layer 296, a hard magnetic bias layer 212 that is aligned with the pole layer 296 in a track-width direction is indicated by a dotted line. In this embodiment, the bias structure 296 extends a similar distance from the medium-facing surface 266 as the nose length. Although bias layer 212 is depicted as having a stripe height that is equal to the nose length, the nose length can instead extend a greater or lessor amount than the bias structure from the medium-facing surface 266.

Figure 8:
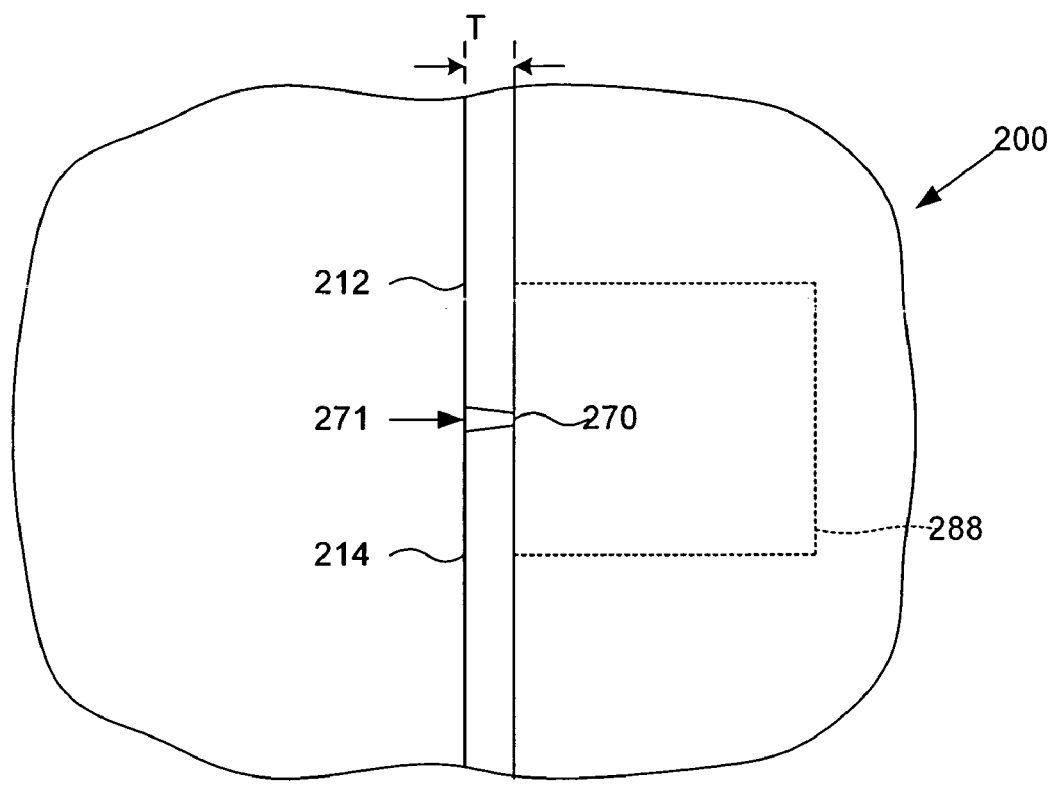
FIG. 8 is a view of the head of FIG. 7 as would be seen from the medium and illustrating a hard magnetic bias structure adjoining the write pole tip.

FIG. 8 is a cutaway view of the head 200 of FIG. 7 as seen from the medium, looking through the thin transparent coating 297 of the medium-facing surface 266, which are therefore not evident in this figure. Hard magnetic bias layers 212 and 214 form a bias structure that adjoins opposed sides of write pole layer 268 and tip 270. Although bias structure 212 is depicted with a thickness (T) that is similar to that of the write pole layer, bias structure 212 may instead have a greater or lesser thickness. Also, bias layers 212 and 214 may be separated from write pole layer 268 and tip 270 by a thin nonmagnetic layer that may be between a nanometer and a micron In thickness.

Figure 9:
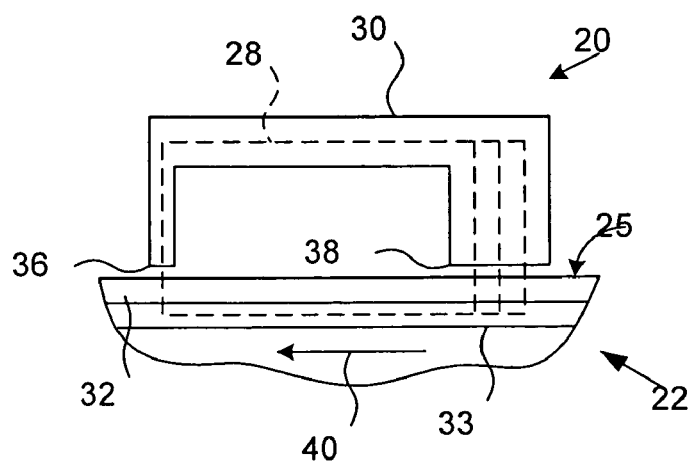
FIG. 9 is a cross-section of a prior art system for perpendicular recording, including a transducer with a write pole and a return pole and a medium with a soft magnetic underlayer.

FIG. 9 is a cutaway view of a head 210 similar to that of FIG. 8, as seen from the medium, but which includes a hard magnetic bias structure 222 that is separated from write pole tip 270 by a submicron nonmagnetic layer. The separation between bias structure 222 and pole tip 270 may be in a range between a few angstroms and about one micron.

FIG. 10 is a cutaway view of a head 230 similar to that of FIG. 8, as seen from the medium, but which includes a pair of hard magnetic bias structures 232 and 233 that are separated from each other by a submicron nonmagnetic structure 234 but which essentially adjoin write pole tip 270. Submicron nonmagnetic structure 234 may serve as a mask during the formation of write pole tip 270.

Referring again to FIG. 1, a method for making the head 60 is described. The head 60 is formed in a number of thin-film transducer layers, along with thousands of similar heads, not shown, on the wafer substrate 61, which may be made of alumina-titanium-carbide, alumina, silicon-carbide, ferrite or other known materials. Atop the wafer substrate 61 the first soft magnetic shield layer 92 is formed, for example by window frame plating, either directly on the substrate or atop a seed layer, not shown. After completion of processing, first shield layer 92 may have a thickness of about one or two microns, a height measured from the medium-facing surface of about thirty microns and a width of about ten or twenty microns, for example.

An alumina or other dielectric layer is then deposited and lapped to form a coplanar surface with the first shield layer 92. A first nanoscale read gap layer of nonmagnetic, electrically insulating material is formed on the shield layer, followed by the magnetoresistive (MR) sensor 90. A second nanoscale read gap layer of nonmagnetic electrically insulating material is then formed between the MR sensor and the second soft magnetic shield layer 94. The MR sensor 90 may be electrically connected to the shield layers 92 and 94 in some embodiments, such as spin-dependent tunneling sensors.

The second shield layer 94 is formed, for example by window frame plating, to a thickness after lapping of about one or two microns and a width of about ten or twenty microns, for example. The height of second shield layer 94 is a controlled parameter in obtaining zero stray field at the MR sensor 90 for the dual reverse coil arrangement, and may be about equal to that of the pole layers 68 and 88, or about ten microns in this embodiment after completion of fabrication. Since other factors may be employed to obtain zero stray field at the MR sensor 90, the height of the second shield layer may be in a range between about five microns and one hundred microns.

After lapping the second shield layer 94 another dielectric layer is formed to a thickness that may preferably be between less than one micron and several microns, upon which electrically conductive coil layer 93 is formed, for example by electroplating followed by curing photoresist or filling with alumina. Coil layer 93 may be formed of copper, gold, silver or other electrically conductive materials. A coil layer 202 similar to coil layer 93 is shown in perspective view in FIG. 8. Coil layer 93 is formed in a spiral pattern with winding sections 84 substantially parallel to the medium-facing surface 66 in a region adjacent to second shield 94. Coil layer 93 may have a thickness on the order of one micron, and winding sections 84 may have a rectangular cross-section of about one micron in thickness by one and one-half microns in height in one embodiment, with a distance between winding sections 84 of about one micron. The distance of the coil layer 93 from the media-facing surface 66 may be in a range between about two microns and six microns in this embodiment.

After polishing the coil layer 93 a first portion of an electrically conductive interconnect is formed, similar to interconnect 205 shown in FIG. 8, upon which another dielectric layer is formed to a thickness that may preferably be between less than one micron and several microns, after lapping that exposes the interconnect portion. The third ferromagnetic layer 88 is then formed along with another portion of the electrically conductive interconnect, for example by separate frame plating steps. The third soft magnetic layer 88 has a thickness after lapping that may be about one micron, is spaced about one to three microns from the medium-facing surface, and extends about eight to fifteen microns from the medium-facing surface, for example. The third ferromagnetic layer 88 has a tapered width that funnels magnetic flux to the pole tip 70, the width ranging from about ten microns distal to the media-facing surface 33 to lees than one micron, e.g., 0.2 micron adjacent to the pole tip 70.

The first ferromagnetic layer 68 is then formed of high magnetic saturation (high $B_{SAT}$) material, for example by sputtering or other known techniques. High magnetic saturation materials that may be used to form layer 68 include FeN and FeN based alloys, predominantly iron NiFe, CoFe and related alloys, etc. The first ferromagnetic layer 68 may have a tapered shape that mirrors that of third ferromagnetic layer 88 but extends further to terminate in pole tip 70. The first ferromagnetic layer 68 may be less than one-half micron in thickness and may be formed to have a trapezoidal cross-section parallel to the medium-facing surface, as disclosed in U.S. patent application Ser. No. 09/933,508, which is incorporated by reference herein. Write pole layer 68 may, for example, include a laminate of sputtered high magnetic saturation layers that have been masked and trimmed by IBE. Bias structures 74 and 76 are than formed, for example by sputtering high coercivity materials such as CoSm, after which the mask is lifted off. The stripe height of structures 74 and 76 may then be defined by a masked IBE.

The nanoscale nonferromagnetic gap 77 is then formed of insulating material such as alumina, silicon dioxide or the like, or conductive material such as tantalum, chromium, nickel-chromium or the like, the thickness the gap 77 layer depending upon the desired spacing between the pole tip 70 and the soft magnetic underlayer 55 of the medium 50 and the desired angle of maximum flux from trailing corner 71.

The soft magnetic pedestal 75 and soft magnetic stud 79 are then formed in plural layers to a thickness of between about two and ten microns by techniques such as window frame plating to connect the pole layer 68 with the pole layer 78. After forming the gap 77 a first layer of soft magnetic pedestal 75 and soft magnetic stud 79 are formed along with another portion of the electrically conductive interconnect, for example by separate frame plating steps.

Electrically conductive coil layer 91 may then be formed, for example by frame plating of copper, gold, silver or other electrically conductive materials. Coil layer 91, similar to coil layer 200 shown in FIG. 8, is formed in a spiral pattern with coil sections 82 that are substantially parallel to the media-facing surface 33 in a region adjacent to pole layer 68. A central coil section 82 is connected with the electrically conductive interconnect. Coil layer 91 may have a thickness on the order of one micron, and winding sections 84 may have a rectangular cross-section of about one micron in thickness by one and one-half microns in height in one embodiment, with a distance between winding sections 84 of about one micron.

After polishing the coil layer 91 a final portion of soft magnetic pedestal 75 and soft magnetic stud 79 are formed, upon which another dielectric layer is formed to a thickness that may preferably be between less than one micron and several microns, after lapping that exposes the stud portion. The remainder of second ferromagnetic layer 78 is then formed, for example by frame plating, to a thickness between less than one micron and several microns, e.g., 1.5 microns, a height that preferably matches that of the ferromagnetic layer 68 and a width that may be tens of microns in the coupling region 65. Ferromagnetic layer 78 terminates adjacent the media-facing surface in a second pole tip 80 that faces the medium 50, second pole tip 80 having a medium-facing surface at least two orders of magnitude larger than that of first pole tip 70. For example, second pole tip 80 may have a media-facing area that is greater than 10 square microns, so that second pole tip may have a medium-facing area that is between 100 and 100,000 times larger than that of first pole tip 70.

A protective coating of dielectric material such as alumina or DLC is then formed over ferromagnetic layer 78, to form the trailing end of the head 60. Electrical connections, similar to elements 208 and 210 shown in FIG. 8, extend from coil layers 91 and 93, respectively, to provide electrical contacts either on the trailing end 64 or on a back surface of the head disposed opposite to the media-facing surface 66. Similar electrical leads, not shown, extend from the MR sensor 90 to provide additional electrical contacts either on the trailing end 64 or the back surface.

After forming the protective coating to create the trailing end 64, the wafer substrate 61 and attached thin film layers are diced to form rows of heads, as is known in the art, and the medium-facing surface is formed. The protective coating 97 of hard dielectric material such as DLC, ta-C, SiC or the like is formed. The rows are then divided into individual heads that are attached to suspensions for positioning adjacent to disks in drive systems.

The invention claimed is:

1. A magnetic head having a leading end, a trailing end and a medium-facing surface, the head comprising:
   a soft magnetic write pole that terminates in a pole tip that is disposed adjacent to the medium-facing surface;
   at least one coil section that is disposed adjacent to the write pole to induce a magnetic flux in the write pole; and
   a hard magnetic bias structure disposed within one micron of the pole tip to magnetically bias the pole tip.

2. The head of claim 1, wherein the magnetic bias structure adjoins the write pole.

3. The head of claim 1, wherein the magnetic bias structure is separated from the write pole by a submicron nonferromagnetic layer.

4. The head of claim 1, wherein the magnetic bias structure includes a hard magnetic layer disposed adjacent to the pole tip.

5. The head of claim 4, wherein the hard magnetic layers are separated from each other in a track-width direction.

6. The head of claim 1, wherein the magnetic bias structure includes a plurality of hard magnetic layers disposed on opposite sides of the pole tip.

7. The head of claim 1, wherein the pole tip has a trapezoidal shape.

8. A magnetic head having a leading end, a trailing end and a medium-facing surface, the head comprising:
   a first ferromagnetic layer that terminates adjacent to the medium-facing surface in a first pole tip;
   a second ferromagnetic layer that terminates adjacent to the medium-facing surface in a second pole tip, the second ferromagnetic layer being magnetically coupled to the first ferromagnetic layer, the second pole tip having an area that is at least two orders of magnitude greater than that of the first pole tip; and
   a third ferromagnetic layer having a coercivity that is higher than that of the first and second ferromagnetic layers, the third ferromagnetic layer being disposed within one micron of the first pole tip to magnetically bias the first pole tip.

9. The head of claim 8, wherein the third ferromagnetic layer adjoins the first ferromagnetic layer.

10. The head of claim 8, wherein the third ferromagnetic layer is separated from the first ferromagnetic layer by a submicron nonferromagnetic layer.

11. The head of claim 8, wherein the third ferromagnetic layer includes a hard magnetic layer disposed adjacent to the first pole tip.

12. The head of claim 8, further comprising a fourth ferromagnetic layer that is disposed within one micron of the first pole tip and separated from the third ferromagnetic layer by the first pole tip.

13. The head of claim 12, wherein the hard magnetic layers are separated from each other in a track-width direction.

14. The head of claim 12, wherein the first pole tip has a trapezoidal shape.

15. A disk drive comprising:
   a magnetic disk; and
   a magnetic head including a soft magnetic write pole that terminates in a pole tip that is disposed adjacent to the medium-facing surface, at least one coil section that is disposed adjacent to the write pole to induce a magnetic flux in the write pole, and a hard magnetic bias structure disposed within one micron of the pole tip to magnetically bias the pole tip.

16. The disk drive of claim 15, wherein disk has a major surface and a media layer disposed adjacent to the major surface, the media layer having an easy axis of magnetization that is oriented substantially perpendicular to the major surface.

17. The disk drive of claim 15, wherein the hard magnetic bias structure adjoins the write pole.

18. The disk drive of claim 15, wherein the hard magnetic bias structure is separated from the write pole by a submicron nonferromagnetic layer.

19. The head of claim 15, wherein the pole tip has a trapezoidal shape.

20. A disk drive comprising:
a magnetic disk; and
a magnetic head including a soft magnetic write pole that terminates in a pole tip that is disposed adjacent to the medium-facing surface, at least one coil section that is disposed adjacent to the write pole to induce a magnetic flux in the write pole, and a hard magnetic bias structure disposed within one micron of the pole tip to magnetically bias the pole tip;
wherein the magnetic bias structure includes a plurality of hard magnetic layers disposed on opposite sides of the pole tip.

21. The disk drive of claim 20, wherein the hard magnetic layers are separated from each other in a track-width direction.

22. A disk drive comprising:
a magnetic disk; and
a magnetic head including a soft magnetic write pole that terminates in a pole tip that is disposed adjacent to the medium-facing surface, at least one coil section that is disposed adjacent to the write pole to induce a magnetic flux in the write pole, and a hard magnetic bias structure disposed within one micron of the pole tip to magnetically bias the pole tip;
wherein the magnetic bias structure includes a hard magnetic layer disposed adjacent to the pole tip.

23. A disk drive comprising:
a rigid disk having a major surface and a media layer disposed adjacent to the major surface, the media layer having an easy axis of magnetization that is oriented substantially perpendicular to the major surface; and
a head including a soft magnetic pole tip that is disposed adjacent to the disk to write information on the media layer, the head having a hard magnetic bias structure disposed within one micron of the pole tip to magnetically bias the pole tip.

24. The disk of claim 23, wherein the hard magnetic bias structure adjoins the pole tip.

25. The disk of claim 23, wherein the hard magnetic bias structure is separated from the pole tip by a submicron nonferromagnetic layer.

26. The disk of claim 23, wherein the pole tip has a trapezoidal shape.

27. A disk drive comprising:
a rigid disk having a major surface and a media layer disposed adjacent to the major surface, the media layer having an easy axis of magnetization that is oriented substantially perpendicular to the major surface; and
a head including a soft magnetic pole tip that is disposed adjacent to the disk to write information on the media layer, the head having a magnetic bias structure disposed within one micron of the pole tip to magnetically bias the pole tip;
wherein the magnetic bias structure includes a plurality of hard magnetic layers disposed on opposite sides of the pole tip.

28. The disk of claim 27, wherein the magnetic bias layers are separated from each other in a track-width direction.

29. A disk drive comprising:
a rigid disk having a major surface and a media layer disposed adjacent to the major surface, the media layer having an easy axis of magnetization that is oriented substantially perpendicular to the major surface; and
a head including a soft magnetic pole tip that is disposed adjacent to the disk to write information on the media layer, the head having a magnetic bias structure disposed within one micron of the pole tip to magnetically bias the pole tip;
wherein the magnetic bias structure includes a hard magnetic layer disposed adjacent to the pole tip.

* * * * *